(12) United States Patent
Zwart (10) Patent No.: US 10,305,670 B2
(45) Date of Patent: **\*May 28, 2019**

(54) DIGITAL ACCESSORY INTERFACE

(71) Applicant: Cirrus Logic International Semiconductor Ltd., Edinburgh (GB)

(72) Inventor: Willem Zwart, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/021,793

(22) Filed: Jun. 28, 2018

(65) Prior Publication Data

US 2018/0309564 A1 Oct. 25, 2018

Related U.S. Application Data (63) Continuation of application No. 15/840,592, filed on Dec. 13, 2017, which is a continuation of application No. 14/928,179, filed on Oct. 30, 2015, now Pat. No. 9,853,804.

(30) Foreign Application Priority Data

Oct. 31, 2014 (GB) .................................. 1419482.3

(51) Int. Cl.
*H04L 5/16* (2006.01)
*H04L 7/00* (2006.01)

(52) U.S. Cl.
CPC .............. *H04L 5/16* (2013.01); *H04L 7/0008* (2013.01)

(58) Field of Classification Search
None
See application file for complete search history.

(56) References Cited

U.S. PATENT DOCUMENTS

| 2006/0192710 | A1 | 8/2006 | Schieblich |
| 2012/0195272 | A1 | 8/2012 | Hong et al. |
| 2014/0226637 | A1 | 8/2014 | MacMullen |
| 2015/0339257 | A1* | 11/2015 | Hug .................. H04L 5/16 710/110 |
| 2016/0020891 | A1 | 1/2016 | Jung et al. |

FOREIGN PATENT DOCUMENTS

WO 2013178274 A1 12/2013

OTHER PUBLICATIONS

International Search Report and Written Opinion, International Application No. PCT/GB2015/053266, dated Jan. 21, 2016, 11 pages.

\* cited by examiner

*Primary Examiner* — Robert M Morlan
(74) *Attorney, Agent, or Firm* — Jackson Walker L.L.P.

(57) ABSTRACT

A method for transferring data over a half-duplex wired communications link, comprises, in each of a plurality of frames:
transferring a synchronization data pattern in a first direction;
transferring first payload data in the first direction;
transferring second payload data in a second direction opposite to the first direction; and
transferring control data, wherein the format of the frame is such that, irrespective of whether the control data is transferred in the first direction or in the second direction, there is only one pair of reversals of a direction of data transfer in each frame.

17 Claims, 10 Drawing Sheets

| Frame# | Sync Bits | Bi-Dir Control | Data up | | | | Data down | | | | Unused |
|---|---|---|---|---|---|---|---|---|---|---|---|
| 0 | 0↓ | 1↓ | Ctrl0↓ | PDMA↑ | PCMA↑ | PCMA↑ | | PCMD↓ | PCMD↓ | PCMD↓ | PCMF↓ | x |
| 1 | 0↓ | 1↓ | Ctrl1↓ | PDMA↑ | PCMB↑ | PCMB↑ | PCMB↑ | PCMD↓ | PCMD↓ | PCMD↓ | PCMF↓ | x |
| 2 | 0↓ | 1↓ | Ctrl2↓ | PDMA↑ | PCMA↑ | PCMA↑ | | | PCME↓ | | PCMF↓ | x |
| 3 | 0↓ | 1↓ | Ctrl3↑ | PDMA↑ | PCMB↑ | PCMB↑ | PCMB↑ | | PCME↓ | | PCMF↓ | x |
| 4 | 0↓ | 1↓ | Ctrl4↑ | PDMA↑ | PCMA↑ | PCMA↑ | | PCMD↓ | PCMD↓ | PCMD↓ | PCMF↓ | x |
| 5 | 0↓ | 1↓ | Ctrl5↓ | PDMA↑ | PCMB↑ | PCMB↑ | PCMB↑ | PCMD↓ | PCMD↓ | PCMD↓ | PCMF↓ | x |
| 126 | 0↓ | 1↓ | Ctrl126↑ | PDMA↑ | PCMA↑ | PCMA↑ | | | PCME↓ | | PCMF↓ | x |
| 127 | 0↓ | 1↓ | Ctrl127↑ | PDMA↑ | PCMB↑ | PCMB↑ | PCMB↑ | | PCME↓ | | PCMF↓ | x |
| 0 | 0↓ | 1↓ | Ctrl0↓ | PDMA↑ | PCMA↑ | PCMA↑ | | PCMD↓ | PCMD↓ | PCMD↓ | PCMF↓ | x |

| Frame# | Sync Bits | | Bi-Dir Control | Data up | | | Data down | | Unused |
|---|---|---|---|---|---|---|---|---|---|
| | ↓ | | | ↓ | ↑ | | ↓ | ↑ | ↑ |
| | Sync Bits | | Bi-Dir Control | N_Symbols | | | | | |
| | | | | Nup | | | Ndown | | |
| 0 | 0↓ | 1↓ | Ctrl0↓ | PDMA↑ | PCMA↑ | PCMA↑ | PCMD↓ PCMD↓ | PCMF↓ | x |
| 1 | 0↓ | 1↓ | Ctrl1↓ | PDMA↑ | PCMB↑ | PCMB↑ | PCMD↓ PCMD↓ | PCMF↓ | x |
| 2 | 0↓ | 1↓ | Ctrl2↓ | PDMA↑ | PCMA↑ | | PCME↓ | PCMF↓ | x |
| 3 | 0↓ | 1↓ | Ctrl3↓ | PDMA↑ | PCMB↑ | PCMB↑ | PCME↓ | PCMF↓ | x |
| 4 | 0↓ | 1↓ | Ctrl4↑ | PDMA↑ | PCMA↑ | PCMA↑ | PCMD↓ PCMD↓ | PCMF↓ | x |
| 5 | 0↓ | 1↓ | Ctrl5↓ | PDMA↑ | PCMB↑ | PCMB↑ | PCMD↓ PCMD↓ | PCMF↓ | x |
| 126 | 0↓ | 1↓ | Ctrl126↑ | PDMA↑ | PCMA↑ | PCMA↑ | PCME↓ | PCMF↓ | x |
| 127 | 0↓ | 1↓ | Ctrl127↑ | PDMA↑ | PCMB↑ | PCMB↑ | | PCMF↓ | x |
| 0 | 0↓ | 1↓ | Ctrl0↓ | PDMA↑ | PCMA↑ | PCMA↑ | PCMD↓ PCMD↓ | PCMF↓ | x |

| ADDR | address0 | WR | data0 |

Figure 8

| ADDR | address1 | ADDR | address0 | WR | data0 |

Figure 9

| ADDR | address0 | WR | data0 | WR | data1 | WR | data2 | WR | data3 |

DIGITAL ACCESSORY INTERFACE

This application is a continuation of U.S. Non-Provisional patent application Ser. No. 15/840,592, filed on Dec. 13, 2017, which is a continuation of U.S. Non-Provisional patent application Ser. No. 14/928,179, filed on Oct. 30, 2015, now U.S. Pat. No. 9,853,804 on Dec. 26, 2017, which claims priority to United Kingdom Patent Application No. 1419482.3, filed Oct. 31, 2014, each of which is incorporated by reference herein in its entirety.

FIELD OF THE DISCLOSURE

This relates to a method of transferring data over a wired communications link. In particular, it relates to an interface that is suitable for example for transferring digital data between a host device and an accessory that is connected by a removable cable to the host device.

BACKGROUND

When connecting an accessory, such as a headset with at least one microphone and at least one speaker, to a host device such as a mobile phone, it is generally required to transmit signals from the host device to the accessory and from the accessory to the host device.

Since many existing host and accessory devices are equipped with standard 4-pin sockets or jacks, there is an advantage in providing an interface that can use a total of four wires for the connection. Since one of the wires is used for a ground connection, there are only three signal conductors available. It is advantageous to use one of these conductors to provide power from the host device to the accessory, to avoid the need to provide a battery in the accessory, and so only two conductors are available for transferring the signals from the host device to the accessory and from the accessory to the host device.

There are known advantages in using balanced transmission, which for example reduces electromagnetic interference (EMI) emissions and improves sensitivity, but this requires the use of two wires per communication path, rather than one.

These factors mean that it may be preferable to provide a bidirectional (half duplex) link between the host device and the accessory on one wire (or on one pair of wires), rather than providing a full duplex link that would have a connection from the host device to the accessory on one wire, and from the accessory to the host device on the other wire.

One issue that arises with a bidirectional link on a single wire is the need to take account of the transmission delay between the host device and the accessory. For example, when one data symbol is transferred in a first direction from a first device to a second device, it arrives at the second device after a certain time delay. Then, if the requirement is that the next data symbol should be transmitted from the second device to the first device, there is a further transmission delay before that next data symbol is received by the first device.

SUMMARY

According to a first aspect of the present invention, there is provided a method for transferring data over a half-duplex wired communications link, comprising, in each of a plurality of frames:

transferring a synchronization data pattern in a first direction;

transferring first payload data in the first direction;

transferring second payload data in a second direction opposite to the first direction; and transferring control data, wherein the format of the frame is such that, irrespective of whether the control data is transferred in the first direction or in the second direction, there is only one pair of reversals of a direction of data transfer in each frame.

The method may comprise transferring the control data, either in the first direction or the second direction, between transferring the synchronization data pattern in the first direction and transferring the second payload data in the second direction.

The method may comprise transferring the synchronization data pattern in the first direction at a start of each frame.

The synchronization data pattern may comprise two symbols of different physical signal levels.

The synchronization data pattern may consist of only two symbols.

The method may comprise transferring first payload data in the first direction for a configurable number of symbols in each frame.

The method may comprise transferring second payload data in the second direction for a configurable number of symbols in each frame.

The method may comprise transferring control data for four or fewer symbols in each frame.

The method may comprise transferring control data for only one symbol in each frame.

The method may comprise, when transferring data in a plurality of said frames:

transferring said control data in a first direction in a first plurality of said frames, and transferring said control data in a second direction in a second plurality of said frames.

The method may comprise transferring data in a plurality of said frames, wherein said frames are grouped in superframes, with a predetermined number of frames in each superframe, wherein the control data from a plurality of the frames in a superframe are combined to form at least one control command.

Each control command may comprise a first plurality of symbols forming a command identifier, and a second plurality of symbols forming an operand of the control command.

The first plurality of symbols may form command identifiers identifying one or more of: an address command, a read command, a write command, and a CRC command.

The control data from a plurality of the frames in a superframe may include at least one of a CRC relating to data sent in the first direction and a CRC relating to data sent in the second direction.

According to a second aspect of the present invention, there is provided a device for transmitting and receiving data over a half-duplex wired communications link according to a method according to the first aspect, the device being configured to, in each of a plurality of frames:

transmit a synchronization data pattern in a first direction;

transmit first payload data in the first direction;

receive second payload data in a second direction opposite to the first direction; and transmit or receive control data, wherein the format of the frame is such that, irrespective of whether the control data is transferred in the first direction or in the second direction, there is only one pair of reversals of a data transfer direction in each frame.

According to a third aspect of the present invention, there is provided a device for transmitting and receiving data over a half-duplex wired communications link according to a method according to the first aspect, the device being configured to, in each of a plurality of frames:

receive a synchronization data pattern in a first direction;
receive first payload data in the first direction;
transmit second payload data in a second direction opposite to the first direction; and
transmit or receive control data, wherein the format of the frame is such that,
irrespective of whether the control data is transferred in the first direction or in the second direction, there is only one pair of reversals of a data transfer direction in each frame.

When multiple method steps are specified, it will be appreciated that the order in which the steps are carried out may or may not be the order in which the steps are listed.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
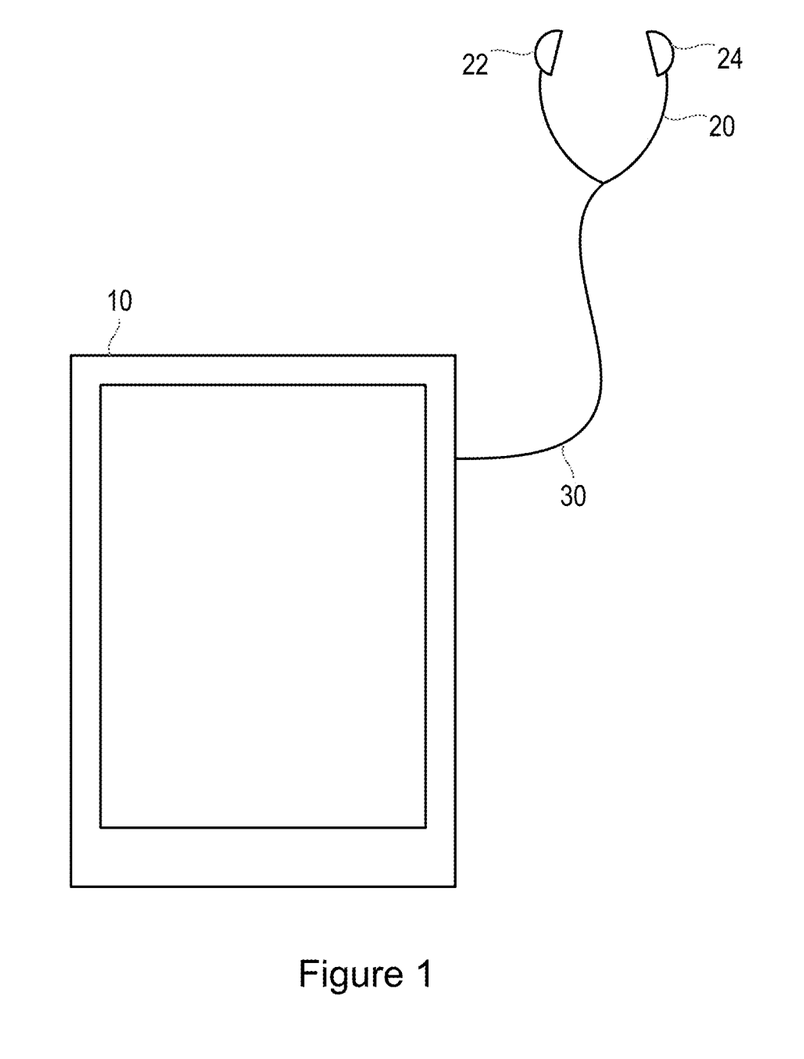
FIG. 1 illustrates a system in accordance with an aspect of the invention.

FIG. 1 shows an audio system, as just one example of a system using the methods described herein.

Specifically, FIG. 1 shows a host device 10, which in this example takes the form of a smartphone, but which may be any device. The method may be used in situations where the host device is a portable audio device, but may also be used in other situations. In this example, the host device has audio processing capability.

FIG. 1 also shows an accessory device 20, which in this example takes the form of a pair of earphones, but which may be any device. In this example, the pair of earphones has two earpieces 22, 24, each of which includes a speaker for reproducing sound in response to audio signals transferred from the host device 10. Each of the earpieces 22, 24 also includes at least one microphone, for example for detecting ambient noise in the vicinity of the wearer.

Signals representing the ambient sound are then transferred from the earphones to the host device 10, which performs a noise cancellation function using an algorithm and generates anti-noise signals that it transfers to the earphones for playback. The effect of playing back the anti-noise signals is that the level of ambient noise heard by the wearer is reduced, and the wanted sounds (music, speech, or the like) that are also being transferred from the host device 10 are therefore more audible.

The accessory device 20 is connected to the host device 10 by means of a cable 30. In one example, the cable 30 may be provided with a conventional 4-pole TRRS jack, while the host device 10 is provided with a matching 4-pole socket. In other examples, the cable may be in any suitable format, for example it may be a USB Type-C connector, which similarly has four poles available for an audio interface. As a further alternative, the accessory device (or the host device) may be provided in a USB Stick dongle, with data being transferred between the dongle and the other device over a USB-compliant wired communications link.

Figure 2:
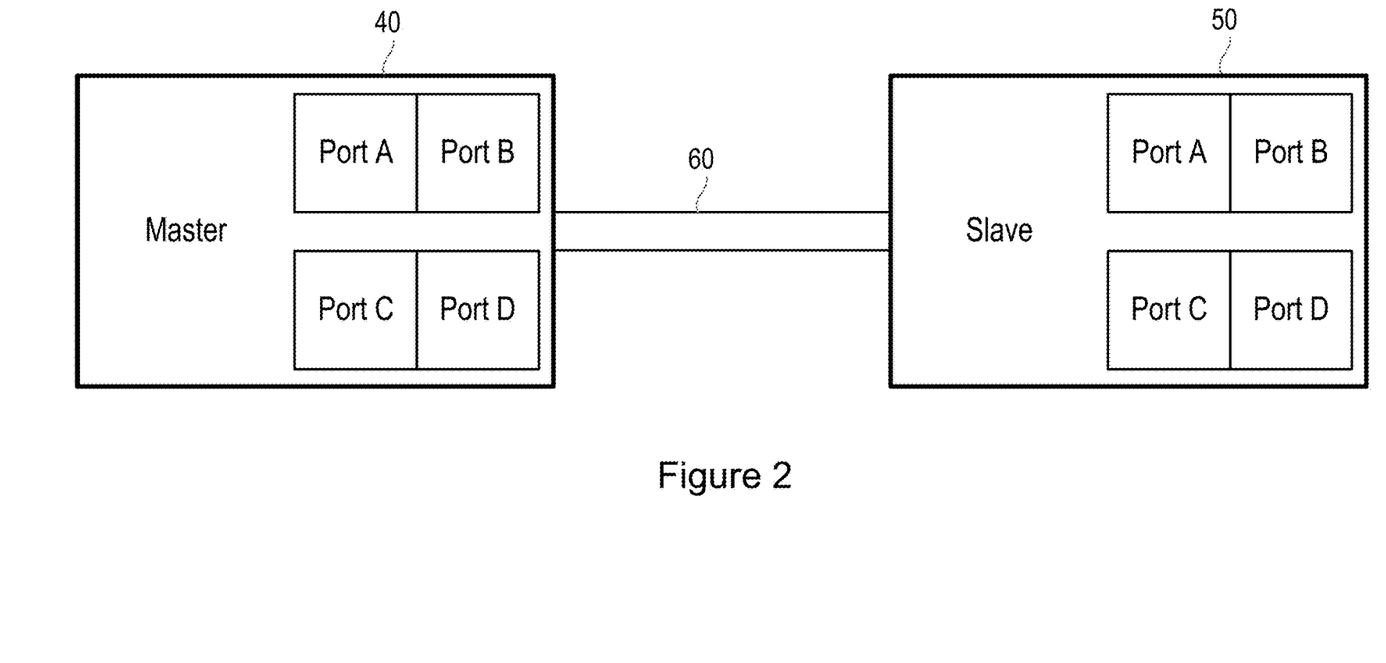
FIG. 2 illustrates a logical topology of the system.

FIG. 2 shows the logical topology of the system. Thus, FIG. 2 shows a master device 40 and a slave device 50 connected through a bus 60. The master device 40 and the slave device 50 each typically have multiple audio ports A, B, C, D for example. The method described herein allows isochronous streams of data to flow between these ports, either from master to slave (referred to herein as the "down" direction) or from slave to master (referred to herein as the "up" direction). Any port on the bus is either a source or a sink. Source ports provide the isochronous streams, while sink ports receive them. Source and sink ports can both live on either master or slave.

For illustration, in the example shown in FIG. 1, the master device 40 may be provided in the host device 10, while the slave device 50 may be provided in the accessory 20.

In this case, the source ports are devices that generate data, for example such as a microphone in one of the earpieces 22, 24, or an output of a processing device in the host device 10. The sink ports are devices that receive data, for example such as a speaker in one of the earpieces 22, 24, or an input of a processing device in the host device 10.

As examples, the ports may provide or receive oversampled audio data, such as pulse-density modulated (PDM) data or pulse-code modulated (PCM) data or bulk data, as examples. In the case of audio data, using oversampled data allows the data to be generated, transmitted, and processed with lower latency, and is therefore advantageous for transferring data used in noise cancellation processing where there are important time constraints on the time taken to generate the noise cancellation signals from the detected ambient noise, while PCM, being a lower sample rate but multi-bit, inherently gives rise to longer latency but is generally more efficient in terms of overall bit rate.

In operation, data is transmitted in a half-duplex fashion up and down a single wired communications link. This may be a single wire, or preferably a balanced pair of wires to allow differential transmission. A third wire may be used to provide power from the host to the accessory or to communicate information. A fourth wire may serve as ground return. Thus a standard 4-pole jack may be used. Alternatively three or four (or more) wires of a standard USB or USB-On the Go connector or a multi-pole connector such as the USB Type-C connector may be used.

Data bits are encoded into symbols. In a preferred embodiment, by way of example only, a single symbol encodes a single bit, such that transmission of a data bit with a value of '0' corresponds to a logic high level applied on a first wire and a logic low level applied on a second wire, whereas transmission of a data bit with a value of '1' corresponds to a logic low level applied on a first wire and a logic high level being applied on a second wire. The described invention can be applied using various encoding methods, irrespective of the number of wires involved to encode the symbols, and of the number of data bits that are encoded in a single symbol.

Figure 3:
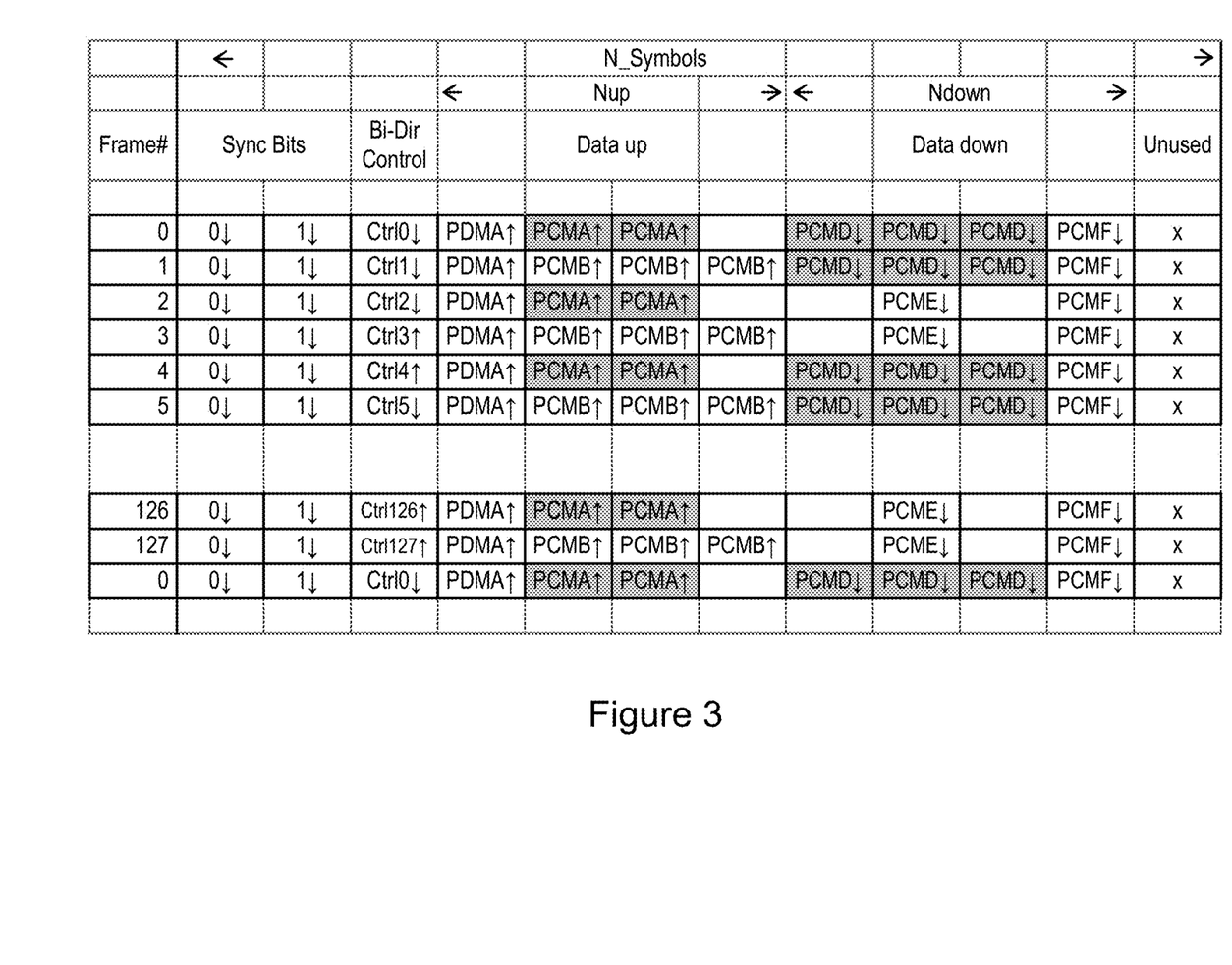
FIG. 3 illustrates a frame structure.

FIG. 3 shows the format in which data is transferred between the master device and the slave device. The interfaces from the master host device to the slave accessory are designed and configured in use such that data is transmitted in the format of a superframe, which in the illustrated example comprises 128 frames, numbered from 0 to 127 in the first column of FIG. 3. Each frame has the same configurable number (N_Symbol) of symbol slots.

The number N_Symbol may for example be configurable to be in the range of 8 to 20. For example, N_Symbol may have a default value of 12, which can be varied if required.

During each symbol slot, one and only one of the interfaces on the bus (i.e. the master or the slave) can transmit a symbol on the bus. If the two interfaces simultaneously attempted to drive a data symbol on the bus, conflicting drive currents would prevent correct transfer of data symbols between the interfaces, even if the time during which the two interfaces drive simultaneously only comprises a fraction of a symbol slot period. Therefore the frame and superframe structure enables a strict orchestration in which each specific symbol slot is allocated for either the master or the slave to be transmitting while the other is receiving.

In addition, correct transfer of data symbols requires that a first interface does not transmit during any next symbol slot until any symbol as transmitted in the preceding symbol slot by a second interface on the bus has been completely transferred, including the transmission delay over the cable associated with the transfer.

In this example, each frame contains only two synchronization (sync) symbols, which are transmitted from the master, and no sync symbols are transmitted from the slave. In this example, the two synchronization (sync) symbols are the first two symbols of each frame.

In this example a predetermined signal pattern is transmitted during the sync symbol slots, such that the slave device can expect this signal pattern in the same position in each frame and can use the transition in the received signal level between the two sync symbol slots to establish and/or maintain synchronization of its clock. In this example the first and second symbol slots encode a logic '0' and '1' respectively.

Each frame also contains a number of symbol slots dedicated for use for transmitting control data. In the illustrated example, only a single symbol slot for control data per frame is provided, as this will be adequate for many purposes. Control data may be transmitted from the master to the slave in some frames, and from the slave to the master in other frames. Where there are multiple symbol slots allocated for control data in each frame, it is possible to allocate one or more of these symbol slots for transmitting control data from the master to the slave, and one or more of these symbol slots for transmitting control data from the slave to the master, in at least some frames.

Each frame may be configured in use to allow transmission of a number of symbols (Nd) down from master to slave and a number of symbols (Nu) up from slave to master in a half-duplex fashion. These numbers may be the same for all frames of the superframe.

To avoid overhead or dead time when changing transmission direction, the order of the sync symbols, control symbols and signal (i.e. payload) data up and down is constrained so that only one pair of reversals of transmission direction occurs in each frame. A single symbol slot may thus be adequate to accommodate a maximum transmission delay between master and slave and back again from slave to master. FIG. 3 shows this single symbol slot as "unused". The position of this unused symbol slot in the frame is explained in more detail below.

Thus the maximum total number of up and down signal data symbols may be N_symbol less the total number of sync symbols, control symbols, and the one further symbol to allow for transmission delay. In the case of two sync symbols, and one control symbol, this allows the transmission of up to (N_symbol—4) signal data symbols per frame. For N_symbol of, say, 20 this gives a symbol slot utilisation factor of 80%. In other words, the total number of symbol slots usable for sync symbols, control symbols, data up and data down is only one less than N_symbol.

The common length (N_symbol) of the frames in a superframe and the allocation of symbols in the various frames of the superframe may be programmed on the fly in use. The frame rate may be predetermined, and the symbol rate increased to accommodate larger numbers of symbols per frame, to preserve the latency, rather than keeping the symbol rate constant and reducing the frame rate.

The allocation of the data symbols may be different from frame to frame in a superframe. This flexibility advantageously allows bitstream oversampled data to pass through with minimal delay, while allowing multi-bit PCM words to be packed efficiently and conveniently and allowing minimisation of any transmission latency. The bidirectional control channel may also be advantageously reconfigured on-the-fly, to accommodate different scenarios requiring more or less control data to be passed up or down the link.

FIG. 3 shows how different data streams may be transmitted on the bus at the same time. Thus, FIG. 3 shows:

a first PCM data stream (PCMA) being transmitted from the slave to the master in two symbol slots of each even-numbered frame;

a second PCM data stream (PCMB) being transmitted from the slave to the master in three symbol slots of each odd-numbered frame;

a third PCM data stream (PCMD) being transmitted from the master to the slave in three symbol slots of the first two frames of each block of four consecutive frames;

a fourth PCM data stream (PCME) being transmitted from the master to the slave in one symbol slot of the last two frames of each block of four consecutive frames;

a first PDM data stream (PDMA) being transmitted from the slave to the master in one symbol slot of each frame; and a second PDM data stream (PDMF) being transmitted from the master to the slave in one symbol slot of each frame.

FIG. 3 also shows how the control symbols are transmitted from the master to the slave in some frames (for example frames 0, 1 and 2) and from the slave to the master in other frames (for example frames 3 and 4).

Figure 4:
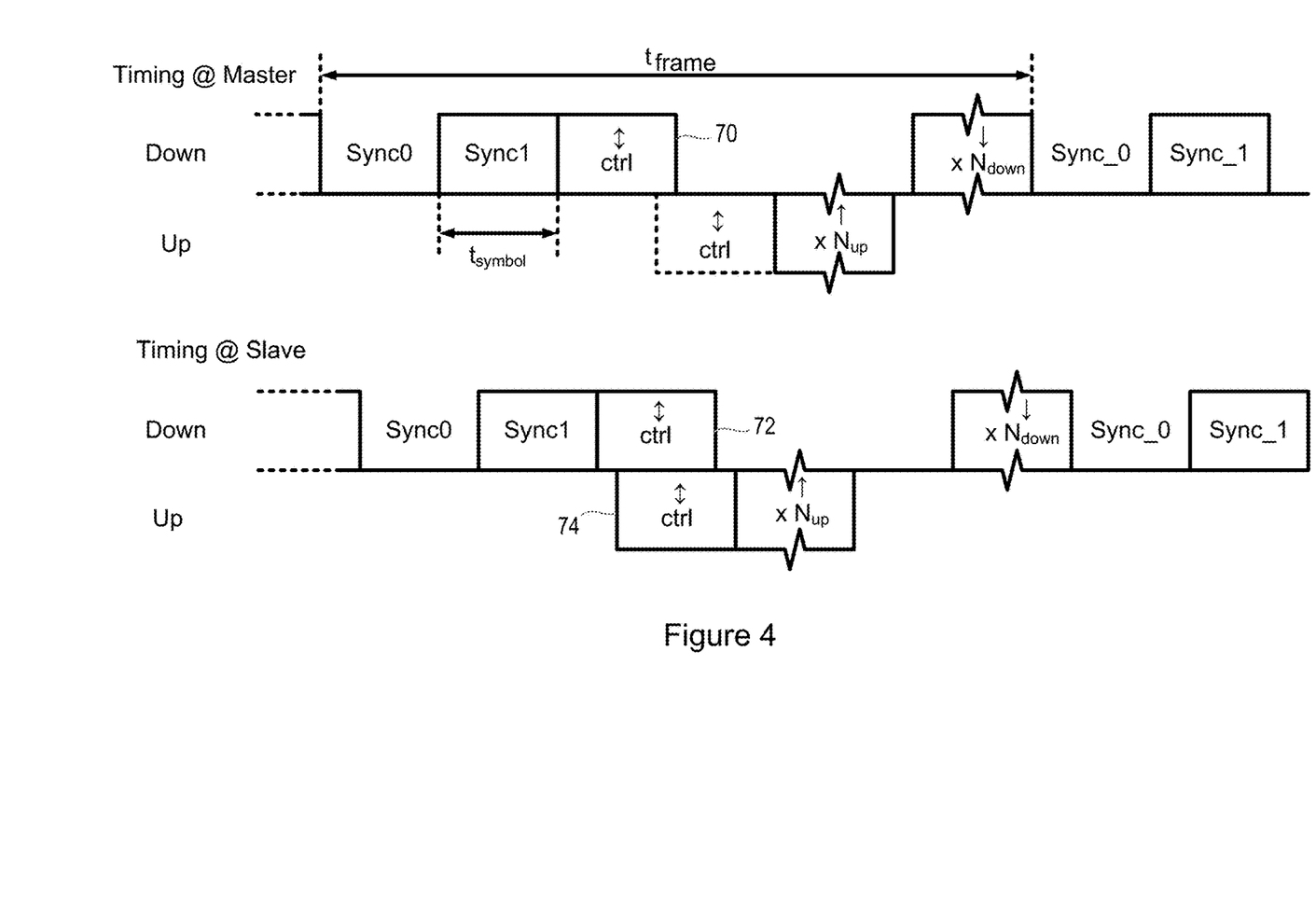
FIGS. 4 to 6 illustrate the timing of signals between first and second devices.

FIG. 4 shows the effect of the transmission delays. Specifically, in FIG. 4, the upper graph shows the frame format with time as observed on the master side, and the bottom graph shows the perception of time on the slave side. In each graph, symbols above the respective central horizontal line represent the symbols driven by the master, while symbols below the respective central horizontal line represent the symbols driven by the slave. The frame period is defined in this diagram as $t_{frame}$, while the symbol period is defined as $t_{symbol}$.

Thus, the first two symbols are the two sync symbols, Sync0 and Sync1, two consecutive symbol slots at fixed opposite signal levels, enabling the slave device to recover the symbol timing.

As shown in FIG. 4, the two sync symbols are received by the slave device slightly later than the times at which they were transmitted by the master device.

The sync symbols are followed by the control (ctrl) symbol. Together the 128 control symbols of a single superframe, one taken from each frame, constitute the control frame, as described in more detail below. Each symbol in the control frame may flow in either direction. The direction in which each symbol of control data flows is defined by prior data bits in the control frame and is governed by the master.

FIG. 4 illustrates two alternative possibilities, which cannot both take place in the same frame. Thus, FIG. 4 shows a control symbol being transmitted by the master at 70 and received by the slave at 72 after the transmission delay. FIG. 4 also shows the alternative possibility, with a control symbol being transmitted by the slave at 74 and received by the master 76 after the transmission delay.

The following $N_{Up}$ symbol slots carry audio data from the slave. There is an empty slot in which neither the master nor the slave transmit any data. Note that on the master side a significant fraction of the last data symbol of the up data from the slave will be coming in during this empty slot. Data bits during these $N_{UP}$ symbol slots in the superframe can be encoded and grouped in a series of consecutive symbols to convey audio streams between source ports on the slave and sink ports on the master.

The following $N_{Down}$ symbol slots carry audio data from the master to the slave. Similarly data bits during this phase can be encoded and grouped in a series of consecutive symbols to convey audio streams between source ports on the master and sink ports on the slave.

The number of symbol slots allocated for data is determined by the total number of symbol slots per frame. That is, $(N_{UP}+N_{Down}) \leq (N\_Symbol-4)$.

Figure 5:
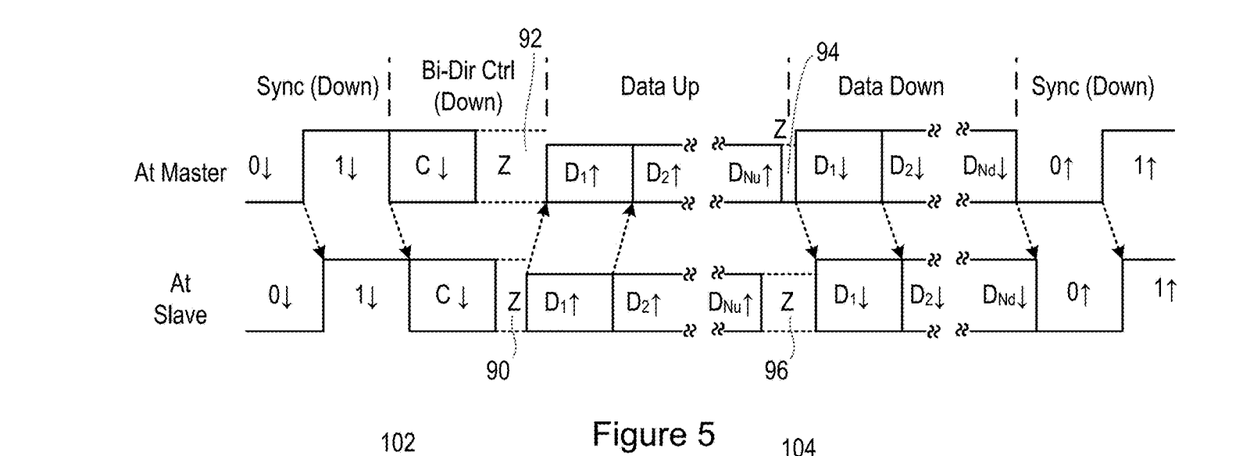

FIG. 5 illustrates one example of the timing in more detail.

As before, each frame has two sync symbols, transmitted from the master to the slave, then a control symbol which may be transmitted in either direction, then a series of data symbols $D_1, D_2, \ldots, D_{Nu}$ transmitted from the slave to the master, and a series of data symbols $D_1, D_2, \ldots, D_{Nd}$ transmitted from the master to the slave. A transmission delay, applies to transmissions in both directions. Symbols transmitted from the slave to the master are illustrated with slightly lower heights than symbols transmitted from the master to the slave, but this is simply for illustrative purposes and has no physical meaning.

Specifically, FIG. 5 illustrates the case in which the bidirectional control slot is allocated for transmission of control data from the master to the slave.

In this case, the slave receives the control symbol, and then transmits the first data up symbol after a delay indicated by the reference numeral 90. Because of the transmission delays in both directions and the delay 90 within the slave, there is a delay indicated by the reference numeral 92 between the time at which the master transmits the control symbol and the time at which the master receives the first data up symbol.

Data from the master to the slave is transmitted synchronous to a master symbol transmission clock (not illustrated) corresponding to a symbol period. Thus when the direction of data transfer is reversed again, the first data symbol down is not transmitted until a whole number of symbol periods since the previous symbol transmitted down (in this case the control symbol sent just prior to delay 92. Thus there is a further delay 94 between when the master receives the last data up symbol until it transmits the first data down symbol. Because of the transmission delays in both directions and this additional delay 94, there is a delay indicated by the reference numeral 96 between the time at which the slave transmits the last data up symbol and the time at which the slave receives the first data down symbol.

Thus, there is a delay at each device when the direction of data flow is changed. The two delays 92, 94 seen at the master device have the same total length as the two delays 90, 96 seen at the slave device. In this example, these two delays, in each case, total one symbol period $t_{symbol}$. Because there are only two such reversals of the data transfer direction in each frame, the total time associated with the transmission delay is smaller than it would be with more direction changes.

Figure 6:
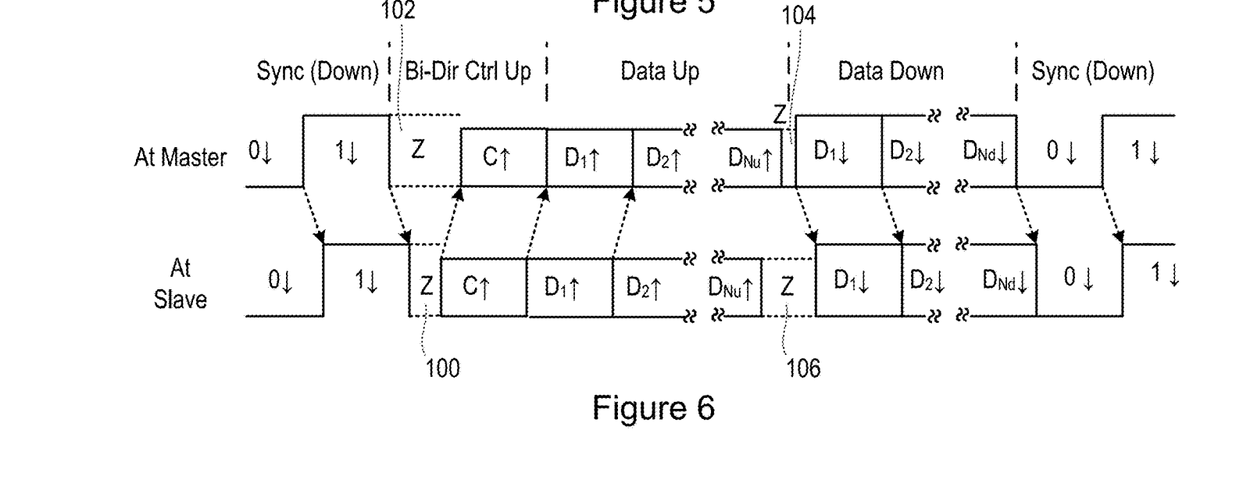

FIG. 6 illustrates another example of the timing, with the same frame structure as in FIG. 5, but in the case in which the bidirectional control slot is allocated for transmission of control data from the slave to the master.

In this case, the slave receives the second sync symbol, and then transmits the control data symbol after a delay indicated by the reference numeral 100. Because of the transmission delays in both directions and the delay 100 internal to the slave, there is a delay indicated by the reference numeral 102 between the time at which the master transmits the second sync symbol and the time at which the master receives the control symbol.

There is in this case no need for a delay between the transmission of the control symbol and the first data up symbol. There is a further delay only when the direction of data transfer is reversed, That is, when the master receives the last data up symbol, it transmits the first data down symbol after a delay indicated by the reference numeral 104 due to waiting for the next edge of the master symbol transmission clock. Because of the transmission delays in both directions and this delay 104, there is a delay indicated by the reference numeral 106 between the time at which the slave transmits the last data up symbol and the time at which the slave receives the first data down symbol.

Again, there is a delay at each device when the direction of data flow is changed, and there are only two such direction changes in each frame, even though the control symbol is in the opposite direction to that shown in FIG. 5. The two delays 102, 104 seen at the master device have the same total length as the two delays 100, 106 seen at the slave device. Again, these two delays, in each case, total one symbol period $t_{symbol}$.

This ensures that a maximally large portion of the frame period can be used effectively for transferring data, inherently optimizing the number of data symbols that can be transferred per unit of time, given the constraints for latency and the required overhead to synchronize two devices on either side of the interface. As a consequence of the ordering of the symbol slots as described, the direction of the data in the control symbol has no impact on the maximal number of data symbols that can be transferred per unit of time.

Figure 7:
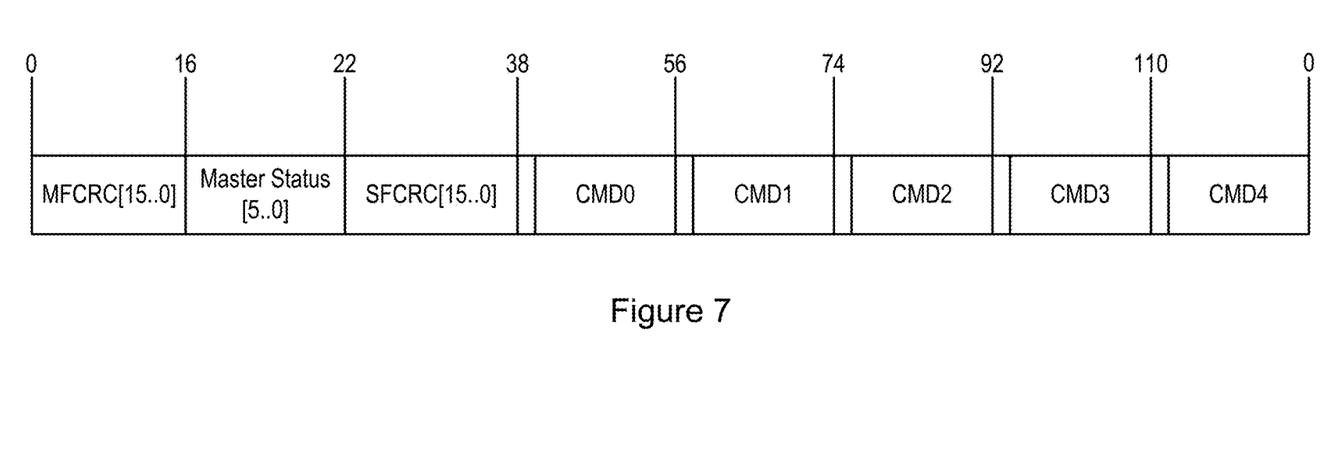
FIG. 7 illustrates a command frame structure.

FIG. 7 shows the structure of a control frame, as discussed above. In this example, the control frame consists of one symbol in each frame of a superframe, so the control frame comprises 128 symbols in total, where each symbol encodes a single bit As mentioned above, data in the control frame can flow in either direction. The direction in which the data flows is defined by a set of rules, which ensure that both master and slave know the direction during each symbol slot that is part of the control frame.

The following description of the control frame talks about bit slots, assuming that any symbol slot conveys one bit, though the described mechanism can be applied for any encoding scheme (i.e. 2 or more data bits per symbol) as long as data symbols only encode data bits flowing in a single direction.

In this illustrated example:

bits 0-15 of the control frame consist of a Master Super Frame Cyclic Redundancy Check (CRC), MSFCRC, holding the CRC over the data sent by the master in the previous Super Frame;

bits 16-21 of the control frame indicate the status of the Master;

bits 22-37 of the control frame consist of a Slave Super Frame CRC (SSFCRC) containing the CRC over the data sent by the slave in the previous Super Frame; and bits 38-55, 56-73, 74-91, 92-109 and 110-127 contain a sequence of five commands, CMD0, CMD1, CMD2, CMD3 and CMD4, each consisting of eighteen bits, and used to perform control data transfer between the master and the slave.

As mentioned above, bits 16-21 of the control frame indicate the status of the Master. More specifically, in one example, the 6-bit Master Status holds the following Master Status bits:

| Section | Bit Slots | Description |
|---|---|---|
| VERSION | 5..4 | This has the purpose to provide forward compatibility. Current version : 0b00. |
| SYNC_ST | 3..2 | Sync Status: NO :0b00 LINK :0b01 UP :0b10 FULL :0b11 Thus, the master can indicate whether it has yet achieved partial or full synchronization with the slave device |
| LAST_BIT | 1 | When LAST BIT is set to 1 the slave will send out a SSFCRC in the next Frame. |
| IGNORE | 0 | When this bit is set to 1 a slave device will ignore the remainder of the control frame, and will not send out a SSFCRC |

In standard implementations the CRC is padded with '0' bits before the actual transmission of the CRC code itself. As a consequence a remainder of the division by the CRC polynomial of a to be protected received bit sequence in concatenation with the received CRC code itself results in a remainder of all '0's when no bit errors have been introduced during the transfer of data.

By padding the CRC with a modified padding sequence this remainder will have a fixed value other than all '0's, independent of the data sequence to be protected.

By padding the CRC with a specific padding sequence the remainder can be guaranteed to be all '1's in the absence of transmission errors.

A characteristic of CRC calculation is that when an arbitrary number of errors is introduced in the transferred data sequence the calculated remainder on the receiving end can obtain each value with the same likelihood. As a consequence the impact on the robustness on the CRC calculation by allowing for a single modified padding sequence to provide a binary messaging mechanism such as associated with the transfer of interrupts only increases the probability of not detecting an erroneously received data sequence by a factor of 2. Such loss of robustness is in forthcoming scenarios acceptable.

The control frame also allows the slave, by applying the above described method of using a modified padding sequence for the calculation of the SSFCRC in the symbol slots allocated for transmitting the SSFCRC, to send an interrupt request to the master.

As mentioned above, each control frame allows the transmission of five commands, each consisting of eighteen bits. These eighteen bits consist in this example of two bits to encode four different possible commands.

In this example, the four possible commands are:

| Command | Operand | Operand From |
|---|---|---|
| ADDR | 16 bit address | MA |
| RD | 16 bit data word to be read by master from slave | SL |
| WR | 16 bit data word to be written by master to slave | MA |
| CRC | 16 bit CRC over previous transfer | SL/MA |

Each command is followed by a 16-bit operand or return value. This ensures that all commands fall in an 18 bit grid. The fixed grid ensures that the slaves can always recover their position within a sequence of commands, minimizing the risk of further escalation of errors when a single bit in the command is detected incorrectly by a slave device.

Read and write transfers are formed by a concatenation of multiple commands plus operands or return values. The rules defining how specific sequences of basic commands result in various more complex transfers ignore the control frame boundary. So, for example, a command occupying two of the 18-bit slots may use two consecutive slots (for example the CMD0 and CMD1 slots) in one superframe, but could just as well use the CMD4 slot in one frame and the CMD0 slot of the subsequent frame.

Thus, commands are all issued by the master device. The default command, when the master is not actively transferring, is the CRC command. Each transfer sequence starts with an ADDR command. A second ADDR command may be used to extend a 16-bit partial address to a 32-bit full address.

One or two ADDR commands are then followed by one or more RD or WR commands. Subsequent RD or WR commands address subsequent registers (thus assuming auto incrementing). The end of a RD or WR transfer is marked by a CRC or subsequent ADDR command.

The first CRC after a WR comes from the master to protect the content of the transfer, including the address. The second CRC after a WR then comes back from the slave, to reliably confirm the reception of the data. The first CRC after a RD comes from the slave, protecting the content of the transfer.

An integrity buffer on the slave enables checking and purging/approving of write transfers before such write transfers are passed on, for instance into registers inside the slave device. The integrity buffer is only used when the slave is in integrity mode. Otherwise, register writes may be directly fed into the registers.

Figures 8, 9:
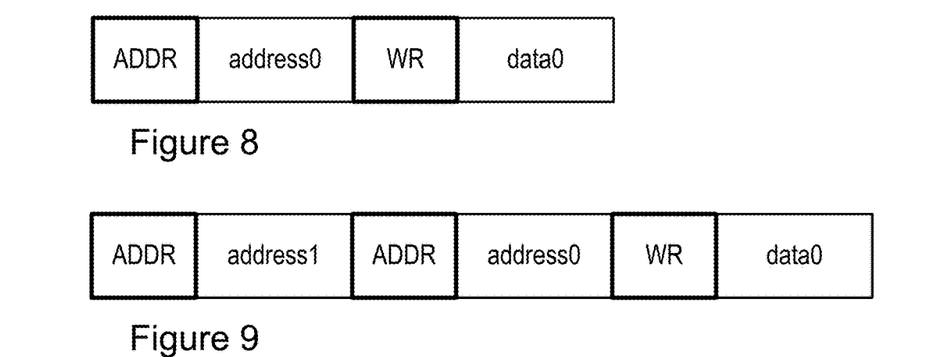
FIGS. 8 to 17 illustrate the format of various commands.

FIG. 8 shows the format of a command for a basic 16 bit data, basic 16 bit address write transfer, consisting of a single ADDR command followed by a WR command. The 16 bit address allows for the addressing of a subset of the devices and ports that can be addressed by a 32 bit address.

Figure 10:
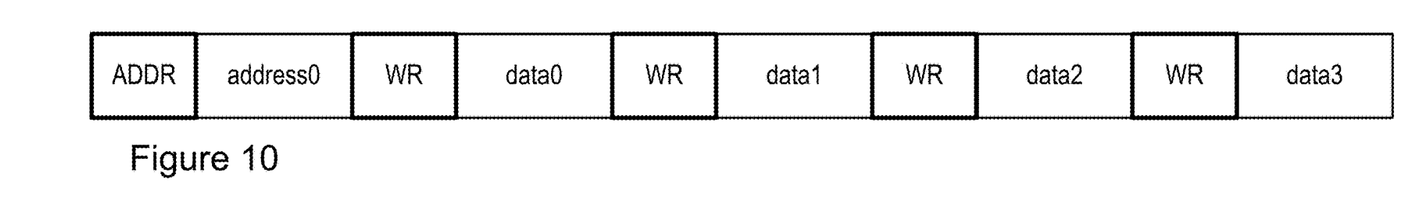

FIG. 9 shows the format of a command for a 16 bit data, full 32 bit address write transfer, consisting of two ADDR commands followed by a WR command:

FIG. 10 shows the format of a command for a 4×16 bit block, basic 16 bit address write transfer, consisting of an ADDR command followed by four WR commands. This is just an illustrative example, as any number of WR commands can follow a single ADDR command. Subsequent bytes words are stored in subsequent address locations. This auto increment function only applies to the RA section of the address, not the DA or PA.

Figure 11:
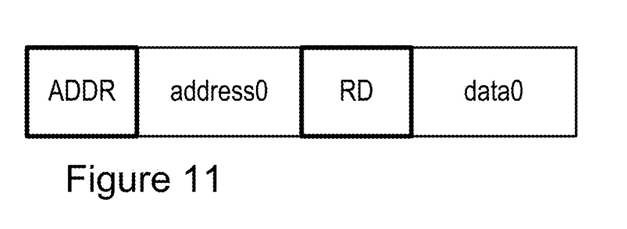

FIG. 11 shows the format of a command for a basic 16 bit data, basic 16-bits address read transfer, consisting of an ADDR command followed by a RD command, with the data, data0, in this case being transferred from the slave to the master.

Figure 12:
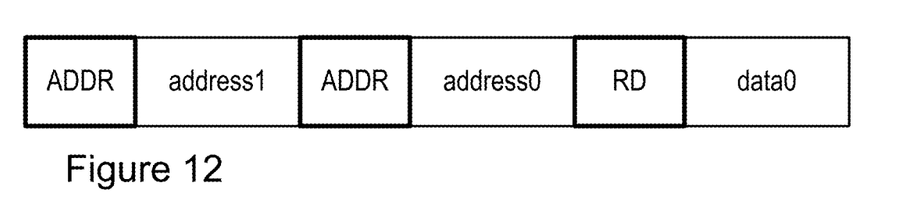

Similarly, as shown in FIG. 12, using two ADDR commands allows full 32 bit addressing.

Figure 13:
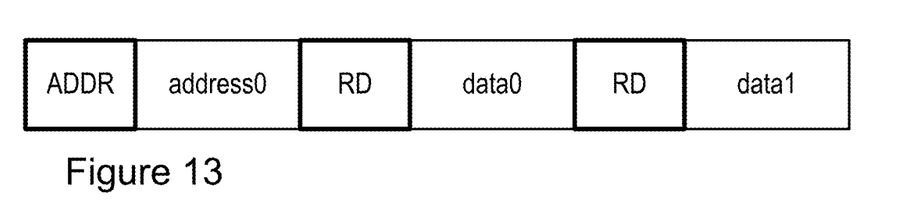

Also, as shown in FIG. 13, multiple consecutive RD commands form a block read command.

Block writing and reading can be combined with Full 32 bit addressing, as well as with basic addressing.

The command scheme also allows for the use of robust reading and writing. A robust write transfer is identical to a non-robust write transfer, with the difference that a robust transfer is concluded by a CRC Command and a CRC from the master. A second CRC command can be given, to which the slave will respond through a CRC to acknowledge the reception of the previous robust write transfer A robust read transfer is identical to a non-robust read transfer, except for the addition of the CRC command and the following 16-bit CRC from the slave.

The robust write transfers make assume the presence of an integrity buffer. During the transfer (read or write) retrieved data is written into the integrity buffer. Data is only retrieved from the integrity buffer once the integrity of the transfer has been confirmed by means of the CRC concluding the transfer. Only then it will find its way into the registers of the slave in case of a write transfer, or be accepted by the master in case of a read transfer.

Figure 14:
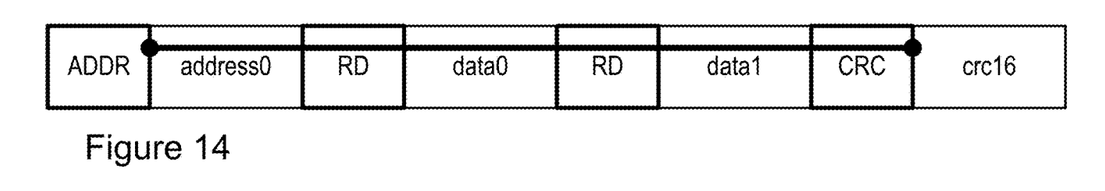

FIG. 14 shows the command sequence for a robust block read, using basic addressing, where data0, data1 and crc16 are sent from the slave to the master. The horizontal line, whose right hand end covers the CRC block, indicates which data bits (CMD+OPERAND/RESPONSE) are covered by the respective CRC.

Figure 15:
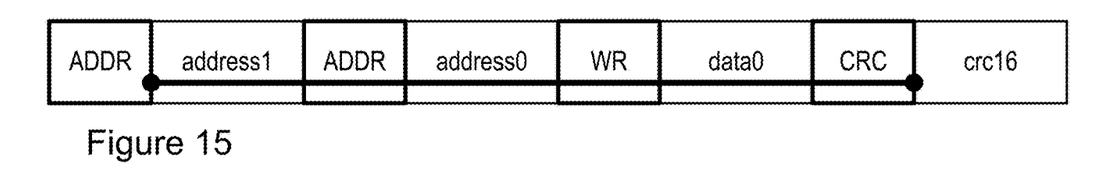

FIG. 15 shows the command sequence for a robust 1-word write, with full addressing, and therefore having two ADDR commands, one WR command, and one CRC command.

Figure 16:
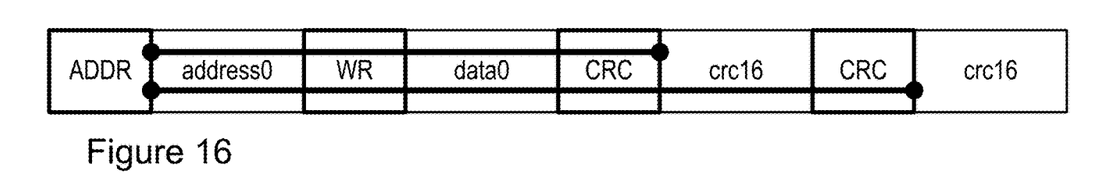

FIG. 16 shows the command sequence for a robust 1-word write, with basic addressing, and with acknowledge and therefore having one ADDR command, one WR command, and two CRC commands, with data0, and the first crc16 being sent from the master to the slave and the second crc16 being sent from the slave to the master.

Figure 17:
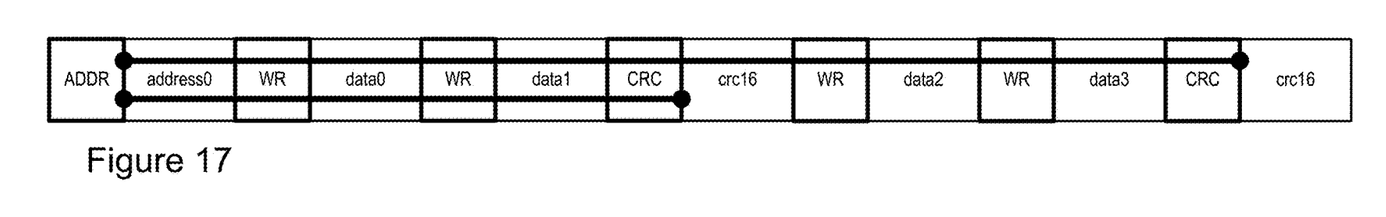

FIG. 17 shows the command sequence for a robust long block write, with basic addressing, and therefore having one ADDR command, four WR commands, and two CRC commands, with data0, data1, the first crc16, data2, data3 and the second crc16 being sent in that sequence from the master to the slave.

Figure 18:
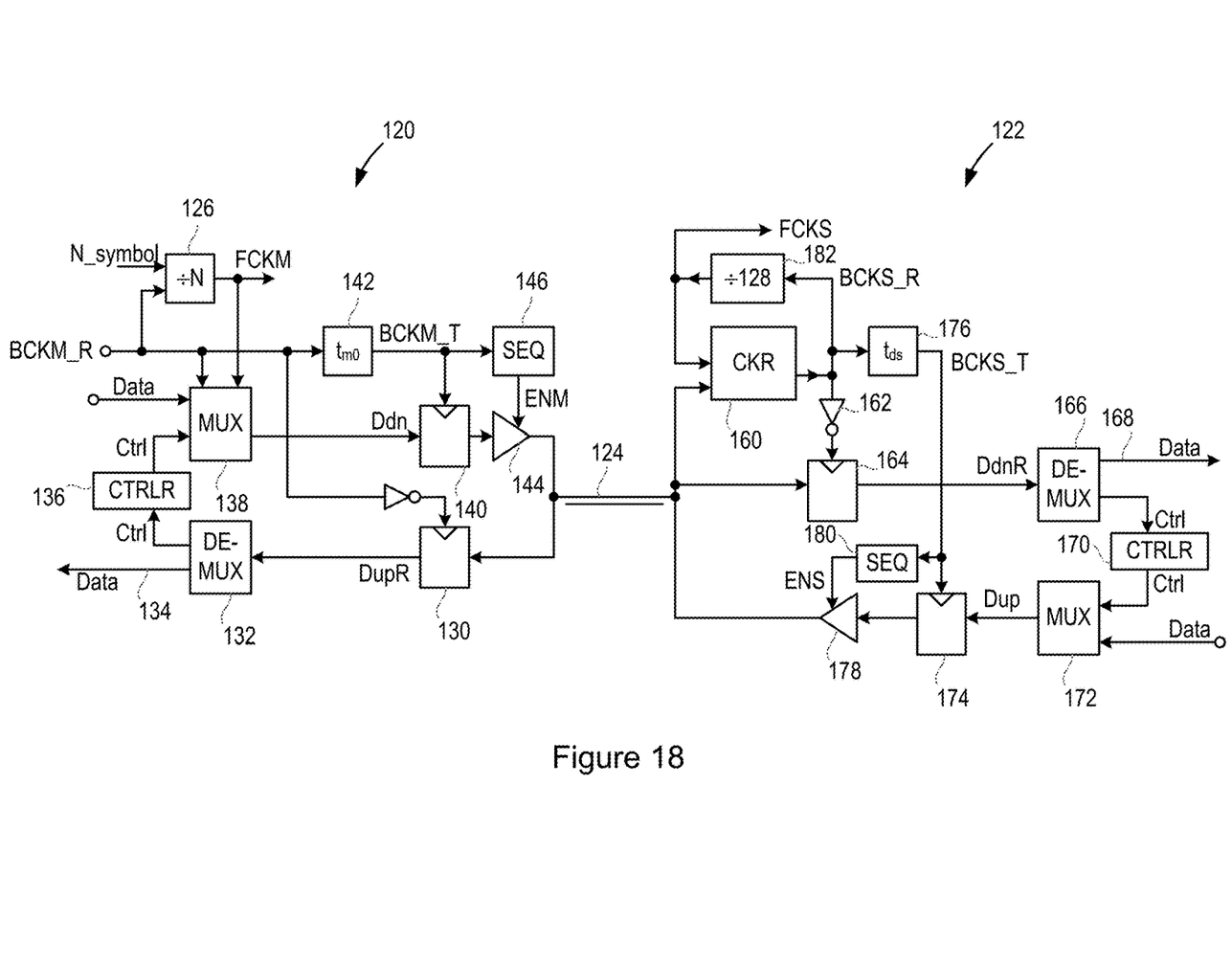
FIG. 18 illustrates first and second devices configured for operating as described herein.

FIG. 18 shows an embodiment of a system as described above, showing a master device 120 and a slave device 122, connected by a bus 124.

In this embodiment, the timing on the master side is set by a master clock BCKM_R, at the symbol rate, and the frame clock FCKM is obtained by dividing that clock in a divider 126 by the number of symbols per frame, N_symbol. (In other embodiments FCKM may be supplied as a master clock and BCKM_R generated therefrom by a clock multiplier, or both clocks may be divided down from some higher-frequency master clock)

The phase of the BCKM_R clock corresponds to the timing at which the master device 120 expects to receive data symbols from the slave device 122. Thus, the BCKM_R clock signal is supplied through an inverter 128 to a receive block 130, which receives data transmitted from the slave. This data contains traffic data and control data, and so the received signal is passed to a demultiplexer 132, which supplies the traffic data on an output 134, and supplies the control data to a controller 136.

When the master side is transmitting data, control data from the controller 136 is multiplexed in a multiplexer 138 with the traffic data to be transferred, and supplied to an output register 140. The BCKM_R clock is passed through a delay block 142 to generate clock pulses BCKM_T whose phase corresponds to the timing at which the master device 120 intends to transmit data symbols. The BCKM_T clock signal is then used to latch the output data from the output flip-flop 140 to a buffer 144. The buffer 144 is controlled by a sequencing block 146, which, with knowledge of which symbol slots in a frame are allocated for transmission from the master to the slave, enables data to be passed through the buffer 144 during the correct time slots.

When data is received at the slave side, the pulses are passed to clock recovery circuit 160. As mentioned previously, the presence of the sync pattern once in each frame allows the synchronization of the slave to the master to be maintained. The clock recovery circuit 160 may for example include a phase-locked loop, with a voltage controlled oscillator generating a clock signal BCKS_R as a multiple of (in this example, 128 times) the frequency of the recovered frame clock FCKS, BCKS_R corresponding to the timing at which the slave device 122 expects to receive data symbols from the master device 120. Thus, the BCKS_R clock signal is supplied through an inverter 162 to a receive block 164, which receives data transmitted from the master. This data contains traffic data and control data, and so the received signal is passed to a demultiplexer 166, which supplies the traffic data on an output 168, and supplies the control data to a controller 170.

When the slave side is transmitting data, control data from the controller 170 is multiplexed in a multiplexer 172 with the traffic data to be transferred, and supplied to an output register 174. The BCKS_R clock is passed through a delay block 176 to generate clock pulses BCKS_T whose phase corresponds to the timing at which the slave device 122 intends to transmit data symbols. The BCKS_T clock signal is then used to latch the output data from the output register 174 to a buffer 178. The buffer 178 is controlled by a sequencing block 180, which, with knowledge of which symbol slots in a frame are allocated for transmission from the slave to the master, enables data to be passed through the buffer 178 during the correct time slots.

The recovered clock BCKS_R, at the symbol rate, is also passed to a divider 182 to obtain a frame clock FCKM by dividing it by the number of symbols per frame.

The invention claimed is:

1. A method for transferring data over a half-duplex wired communications link, comprising:
    transferring first payload data in the first direction in each of a plurality of frames;
    transferring second payload data in a second direction opposite to the first direction in each of said plurality of frames;
    transferring a synchronization data pattern in a first direction in at least a first subset of said plurality of frames; and
    transferring control data in the first direction or in the second direction in at least a second subset of said plurality of frames, wherein a format of each frame in the second subset of said plurality of frames is such that, irrespective of whether the control data is transferred in the first direction or in the second direction, there is only one pair of reversals of a direction of data transfer in each frame.

2. A method as claimed in claim 1, wherein the first subset of said plurality of frames has no frames in common with the second subset of said plurality of frames.

3. A method as claimed in claim 1, comprising transferring the control data, either in the first direction or the second direction, between transferring the synchronization data pattern in the first direction and transferring the second payload data in the second direction.

4. A method as claimed in claim 1, comprising transferring the synchronization data pattern in the first direction at a start of each frame.

5. A method as claimed in claim 1, wherein the synchronization data pattern comprises two symbols of different physical signal levels.

6. A method as claimed in claim 1, wherein the synchronization data pattern consists of only two symbols.

7. A method as claimed in claim 1, comprising transferring first payload data in the first direction for a configurable number of symbols in each frame.

8. A method as claimed in claim 1, comprising transferring second payload data in the second direction for a configurable number of symbols in each frame.

9. A method as claimed in claim 1, comprising transferring control data for four or fewer symbols in each frame.

10. A method as claimed in claim 1, comprising transferring control data for only one symbol in each frame.

11. A method as claimed in claim 1, comprising transferring data in a plurality of said frames, the method comprising: transferring said control data in a first direction in a first plurality of said frames, and transferring said control data in a second direction in a second plurality of said frames.

12. A method as claimed in claim 1, comprising transferring data in a plurality of said frames, wherein said frames are grouped in superframes, with a predetermined number of frames in each superframe, wherein the control data from a plurality of the frames in a superframe are combined to form at least one control command.

13. A method as claimed in claim 12, wherein each control command comprises a first plurality of symbols forming a command identifier, and a second plurality of symbols forming an operand of the control command.

14. A method as claimed in claim 13, wherein the first plurality of symbols form command identifiers identifying one or more of: an address command, a read command, a write command, and a CRC command.

15. A method as claimed in claim 12, wherein the control data from a plurality of the frames in a superframe include at least one of a CRC relating to data sent in the first direction and a CRC relating to data sent in the second direction.

16. A device for transmitting and receiving data over a half-duplex wired communications link, the device being configured to, in each of a plurality of frames:
transmit a synchronization data pattern in a first direction;
transmit first payload data in the first direction;
receive second payload data in a second direction opposite to the first direction;
and transmit or receive control data, wherein a format of each frame of the plurality of frames is such that, irrespective of whether the control data is transferred in the first direction or in the second direction, there is only one pair of reversals of a data transfer direction in each frame.

17. A device for transmitting and receiving data over a half-duplex wired communications link, the device being configured to, in each of a plurality of frames:
receive a synchronization data pattern in a first direction;
receive first payload data in the first direction;
transmit second payload data in a second direction opposite to the first direction;
and transmit or receive control data, wherein a format of each frame of the plurality of frames is such that, irrespective of whether the control data is transferred in the first direction or in the second direction, there is only one pair of reversals of a data transfer direction in each frame.

* * * * *

UNITED STATES PATENT AND TRADEMARK OFFICE
CERTIFICATE OF CORRECTION

PATENT NO. : 10,305,670 B2  
APPLICATION NO. : 16/021793  
DATED : May 28, 2019  
INVENTOR(S) : Willem Zwart Page 1 of 1

It is certified that error appears in the above-identified patent and that said Letters Patent is hereby corrected as shown below:

On the Title Page

1. In Item (63), under "Related U.S. Application Data", in Column 1, Line 2, delete "2017," and insert -- 2017, now Pat. No. 10,298,379, --, therefor.

In the Specification

2. In Column 1, Line 5, delete "2017," and insert -- 2017, now Pat. No. 10,298,379, --, therefor.

3. In Column 7, Line 59, delete "(in" and insert -- in --, therefor.

4. In Column 8, Line 56, delete "bit" and insert -- bit. --, therefor.

5. In Column 10, Line 62, delete "command:" and insert -- command. --, therefor.

6. In Column 11, Line 21, delete "transfer" and insert -- transfer. --, therefor.

7. In Column 11, Line 64, delete "clock)" and insert -- clock). --, therefor.

8. In Column 12, Line 10, delete "output register 140." and insert -- output register 174. --, therefor.

Signed and Sealed this  
First Day of October, 2019

Andrei Iancu  
*Director of the United States Patent and Trademark Office*